United States Patent
Byoun

(10) Patent No.: US 9,245,577 B1
(45) Date of Patent: Jan. 26, 2016

(54) DATA STORAGE DEVICE COMPRISING SPINDLE MOTOR CURRENT SENSING WITH SUPPLY VOLTAGE NOISE ATTENUATION

(71) Applicant: Western Digital Technologies, Inc., Irvine, CA (US)

(72) Inventor: Jaesoo Byoun, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/670,353

(22) Filed: Mar. 26, 2015

(51) Int. Cl.
  G11B 21/02 (2006.01)
  G11B 19/20 (2006.01)
  H02P 6/00 (2006.01)

(52) U.S. Cl.
  CPC .............. *G11B 19/20* (2013.01); *H02P 6/001* (2013.01)

(58) Field of Classification Search
  None
  See application file for complete search history.

(56) References Cited

U.S. PATENT DOCUMENTS

| | | | |
|---|---|---|---|
| 5,682,050 A | 10/1997 | Williams | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |

(Continued)

*Primary Examiner* — K. Wong

(57) ABSTRACT

A data storage device is disclosed comprising a head actuated over a disk and a spindle motor configured to rotate the disk, wherein the spindle motor comprises a plurality of windings. The spindle motor is powered with a power voltage generated in response to a supply voltage. A clamping circuit is enabled when sensing a current flowing from the power voltage through at least one of the windings, wherein the clamping circuit is configured to clamp the power voltage to less than a peak voltage of the supply voltage in order to attenuate noise in the power voltage. The clamping circuit is disabled when not sensing the current.

19 Claims, 7 Drawing Sheets

(56) References Cited

U.S. PATENT DOCUMENTS

| | | |
|---|---|---|
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,532,445 B2 | 5/2009 | Rana et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |

(56) References Cited

U.S. PATENT DOCUMENTS

| | | |
|---|---|---|
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,105 B2 | 6/2010 | Nozaki et al. |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,994,747 B2 | 8/2011 | Boling et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,217,615 B2 | 7/2012 | Tan et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,384,421 B1 | 2/2013 | Ravezzi et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,497,641 B2 * | 7/2013 | Yamashita et al. ..... G11B 19/20 318/400.29 |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,183 B2 | 6/2014 | Bonvin et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |
| 2012/0112681 A1 | 5/2012 | Bonvin et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DATA STORAGE DEVICE COMPRISING SPINDLE MOTOR CURRENT SENSING WITH SUPPLY VOLTAGE NOISE ATTENUATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
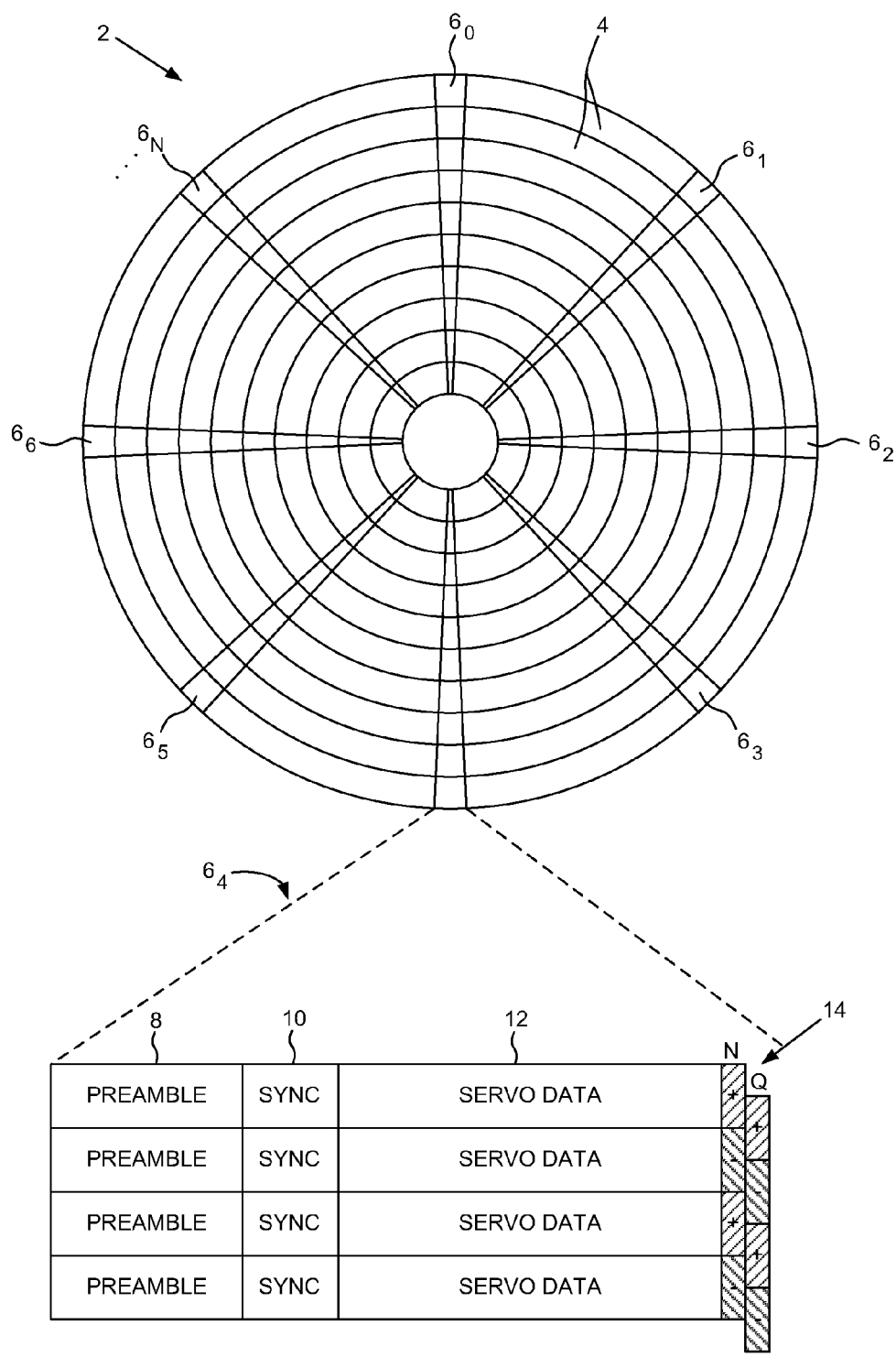
FIG. 1 shows a prior art disk format comprising a plurality of servo tracks defined by servo sectors.
Figure 2A:
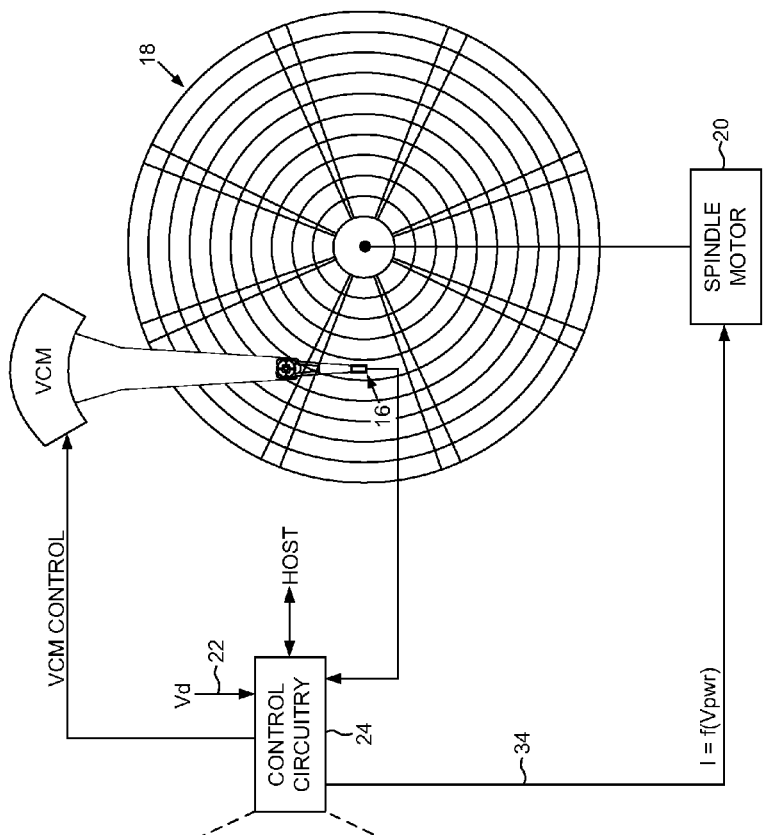
FIG. 2A shows a data storage device in the form of a disk drive according to an embodiment comprising a head actuated over a disk rotated by a spindle motor comprising a plurality of windings and powered by a power voltage generated in response to a supply voltage.
Figure 2B:
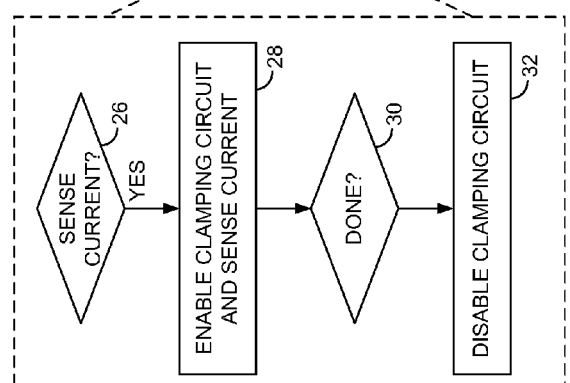
FIG. 2B is a flow diagram according to an embodiment wherein when sensing current flowing from the power voltage through at least one of the windings, the power voltage is clamped to less than a peak voltage of the supply voltage.

FIG. 2A shows a data storage device in the form of a disk drive according to an embodiment comprising a head 16 actuated over a disk 18 and a spindle motor 20 configured to rotate the disk 18, wherein the spindle motor 20 comprises a plurality of windings. The spindle motor 20 is powered with a power voltage generated in response to a supply voltage 22. The disk drive further comprises control circuitry 24 configured to execute the flow diagram of FIG. 2B, wherein when sensing a current flowing from the power voltage through at least one of the windings (block 26), the power voltage is clamped to less than a peak voltage of the supply voltage in order to attenuate noise in the power voltage (block 28). When not sensing the current (block 30), the clamping of the power voltage is disabled (block 32).

Figure 2C:
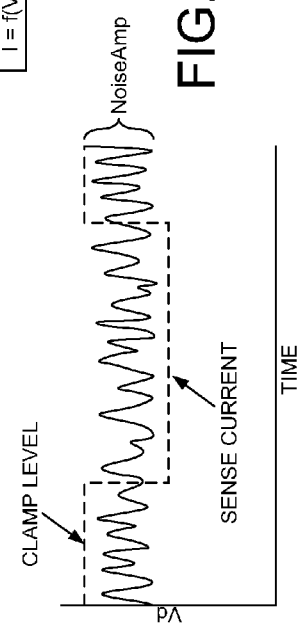
FIG. 2C illustrates the clamping of the power voltage when sensing the current in order to attenuate noise in the power voltage.

The control circuitry 24 may be configured to sense the current flowing from the power voltage through at least one of the windings of the spindle motor 20 for any suitable reason. In one embodiment, the current flowing through the windings may be sensed in order to detect the position of the rotor relative to the stator which may be useful to determine the initial state of a commutation sequence prior to spinning up the spindle motor 20. In the embodiment of FIG. 2A, the current 34 flowing through the windings is a function of the power voltage used to power the spindle motor 20. If the power voltage is generated as the supply voltage 22, the current sensing may be adversely affected by any noise in the supply voltage 22, such as the noise illustrated in the example of FIG. 2C. Accordingly, in one embodiment the power voltage for powering the spindle motor 20 may be clamped to a level below the peak voltage of the supply voltage, for example, to a level that is substantially equal to the peak voltage minus the amplitude of the noise in the supply voltage 22 as illustrated in FIG. 2C. In this manner, the noise in the power voltage is attenuated which increases the accuracy of the current sensing.

Figure 3:
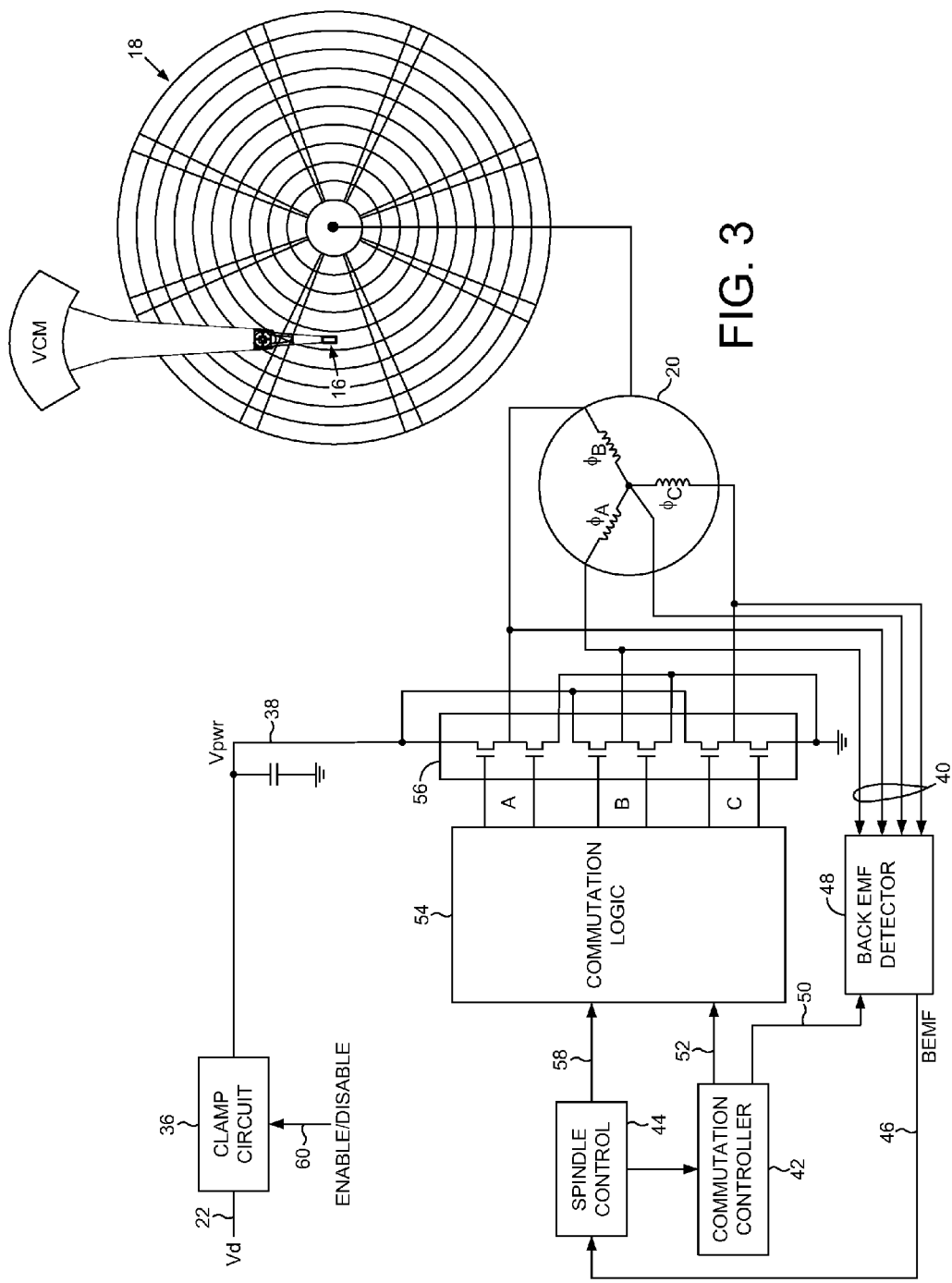
FIG. 3 shows an embodiment wherein a suitable clamp circuit is enabled/disabled based on whether the control circuitry is sensing the current flowing through at least one of the windings.

FIG. 3 shows control circuitry configured to control the operation of the spindle motor, including a clamp circuit 36 configured to clamp the power voltage 38 to less than the supply voltage 22 when sensing the current flowing through at least one winding of the spindle motor 20. During normal operation of the spindle motor 20, a back electromotive force (BEMF) voltage 40 generated by the windings of the spindle motor 20 may be processed in order to drive the commutation sequence of a commutation controller 42. A spindle control block 44 may process a BEMF signal 46 which may be a square wave representing the BEMF zero-crossings as detected by a BEMF detector 48. The commutation controller 42 may generate a control signal 50 which configures the BEMF detector 48 to detect the zero-crossing of the BEMF voltage generated by each winding as the disk rotates. The commutation controller 42 also generates a control signal 52 applied to commutation logic 54. In the embodiment of FIG. 3, the commutation logic 54 is configured by the control signal 52 to control the state of switches 56 in order to drive the windings with the power voltage 38. The commutation logic 54 may operate in any suitable manner, such as by driving the switches 56 as linear amplifiers that apply continuous-time sinusoidal voltages to the windings. In another embodiment, the commutation logic 54 may drive the switches 56 using pulse wide modulation (PWM), such as using square wave PWM, trapezoidal PWM, or sinusoidal PWM. Regardless as to how the windings are driven, the commutation controller 42 generates the control signal 52 so that the windings are commutated at the correct periods, thereby generating the desired rotating magnetic field that causes the spindle motor to rotate. In one embodiment, the spindle control block 44 may generate a control signal 58 that controls the effective amplitude of the driving voltages (continuous or PWM), thereby controlling the speed of the spindle motor 20.

When sensing the current flowing through at least one of the windings, for example, to detect the position of the rotor relative to the stator at the beginning of a spin-up operation, the clamp circuit 36 is enabled by control signal 60 to clamp the power voltage 38 less than the peak voltage of the supply voltage 22 as described above with reference to FIG. 2C, thereby attenuating noise in the power voltage 38. The current flowing from the power voltage 38 through at least one of the windings may be sensed in any suitable manner. In one embodiment, the switches 56 shown in FIG. 3 may comprise suitable circuitry for sensing the current flowing through the windings, and in other embodiment described below, the current flowing through the windings may be sensed by sensing the current flowing through the clamp circuit 36, or by sensing the current flowing through an isolation FET (ISOFET).

Figure 4:
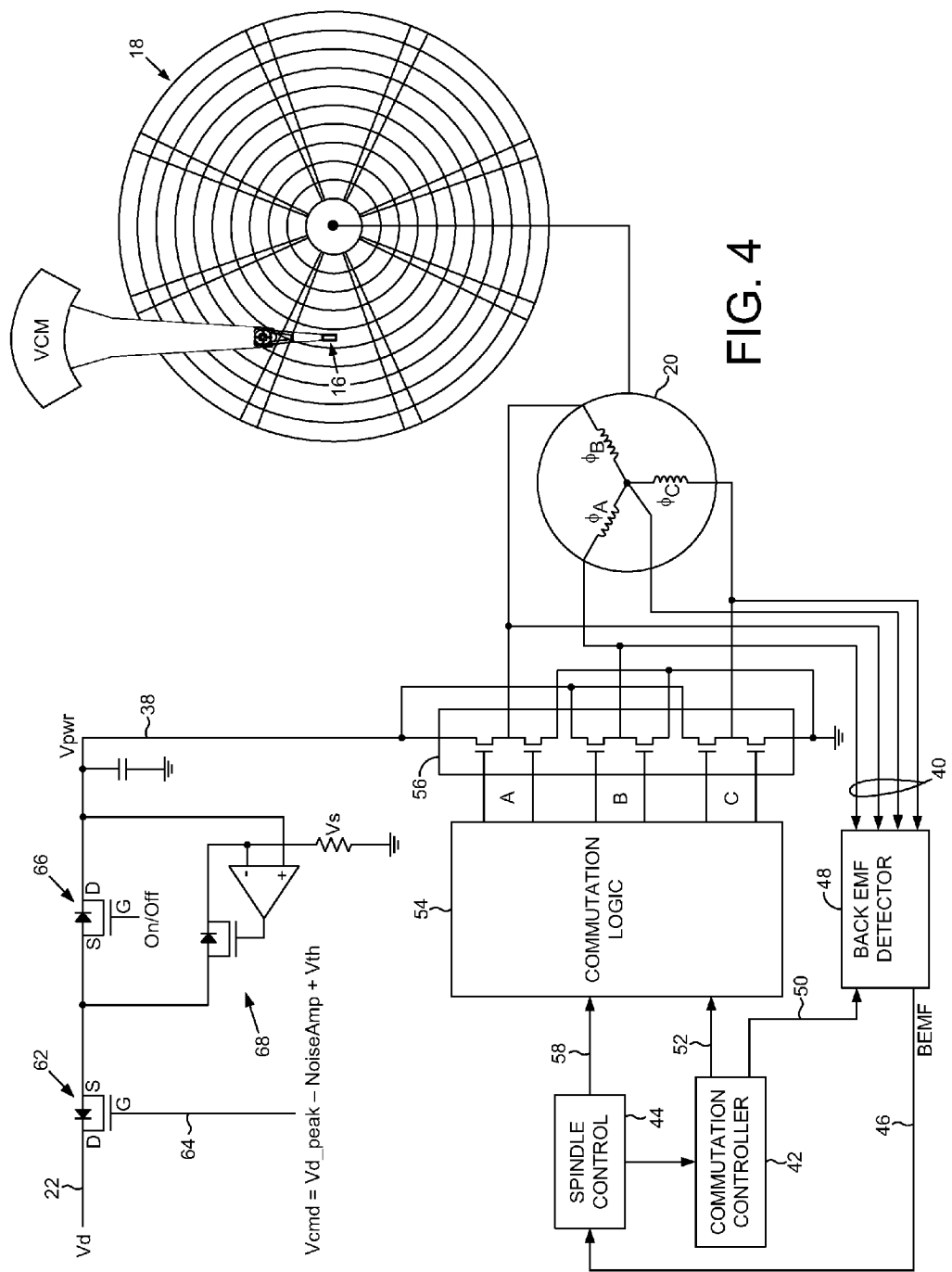
FIG. 4 shows an embodiment wherein the clamping circuit comprises a clamping field effect transistor (FET) configured as a source follower and controlled by a command voltage to clamp the power voltage.

FIG. 4 shows an embodiment wherein the clamp circuit 36 comprises a clamping FET 62 configured as a source follower, wherein the control circuitry enables the clamping circuit 36 by adjusting a command voltage 64 configured to control a gate of the clamping FET 62. For example, in one embodiment the control circuitry configures the command voltage 64 to approximately:

$$Vd\_peak - NoiseAmp + Vth$$

where Vd_peak represents the peak voltage of the supply voltage 22, NoiseAmp represents a noise amplitude in the supply voltage 22, and Vth represents a threshold voltage of the clamping FET 62. In this manner, the source voltage of the clamping FET 62 (and therefore the power voltage 38) is clamped to:

$$Vd\_peak - NoiseAmp$$

as shown in the example of FIG. 2C, thereby attenuating the noise in the power voltage 38 during the current sense mode.

The embodiment of FIG. 4 also comprises an isolation FET (ISOFET) 66 which is configured to an ON state during normal operation. If the supply voltage 22 falls below a threshold (e.g., during a power failure), the ISOFET 66 is configured into an OFF state so that the body diode of the ISOFET 66 prevents current from flowing from the power voltage to the supply voltage 22. In one embodiment illustrated in FIG. 4, suitable current sensing circuitry 68 is coupled to the ISOFET 66 in order to sense the current flowing through the ISOFET 66 and therefore sense the current flowing through at least one of the windings of the spindle motor 20 during the current sense mode.

Figure 5:
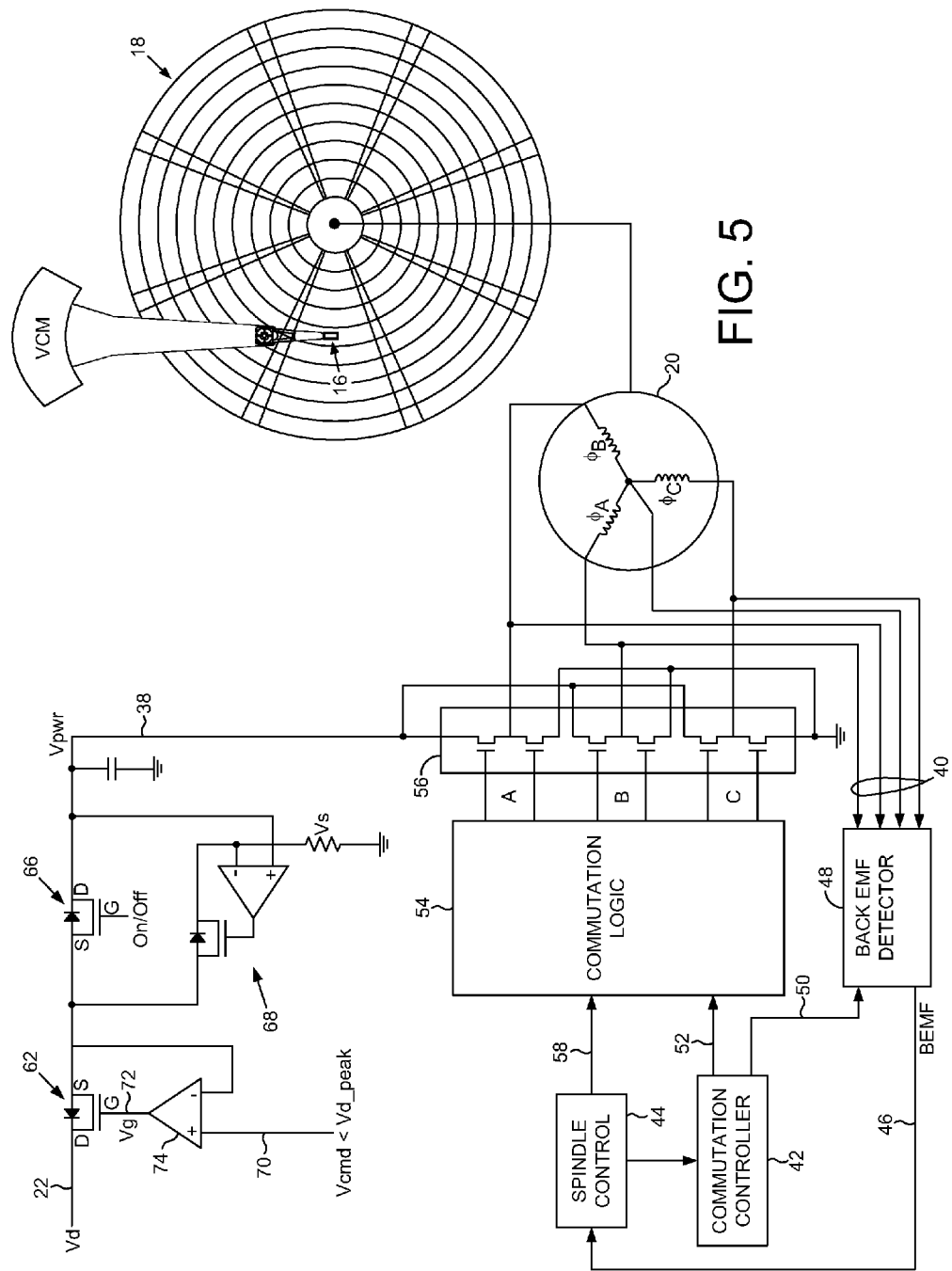
FIG. 5 shows an embodiment wherein a feedback loop generates a gate voltage of the clamping FET based on a difference between the source voltage and the command voltage.

FIG. 5 shows an embodiment wherein the control circuitry 24 enables the clamping circuit 36 by setting a command voltage 70 to approximately:

$$Vd\_peak - NoiseAmp$$

and using a feedback loop to generate a gate voltage 72 based on a difference (generated by comparator 74) between a source voltage of the clamping FET 62 and the command voltage 70. The gate voltage 72 is applied to the gate of the clamping FET 62 which drives the source voltage (and power voltage 38) to the desired clamp level.

In the embodiments described above with reference to FIGS. 4 and 5, when not sensing the current flowing through at least one of the windings the control circuitry 24 may disable the clamping circuit 36 by increasing the command voltage (64 or 70) to a suitable level. For example, in one embodiment the control circuitry 24 may increase the command voltage to a level higher than the supply voltage 22 (using a suitable boost circuit) so that there is no clamping of the power voltage 38 relative to the supply voltage 22 when the clamping circuit 36 is in the disabled state. In another embodiment, the control circuitry 24 may configure the command voltage to near the peak voltage of the supply voltage 22 or a suitable margin below the peak voltage so that the clamping circuit 36 may still provide some amount of clamping of the power voltage 38 even when the clamping circuit 36 is in the disabled state.

Figure 6:
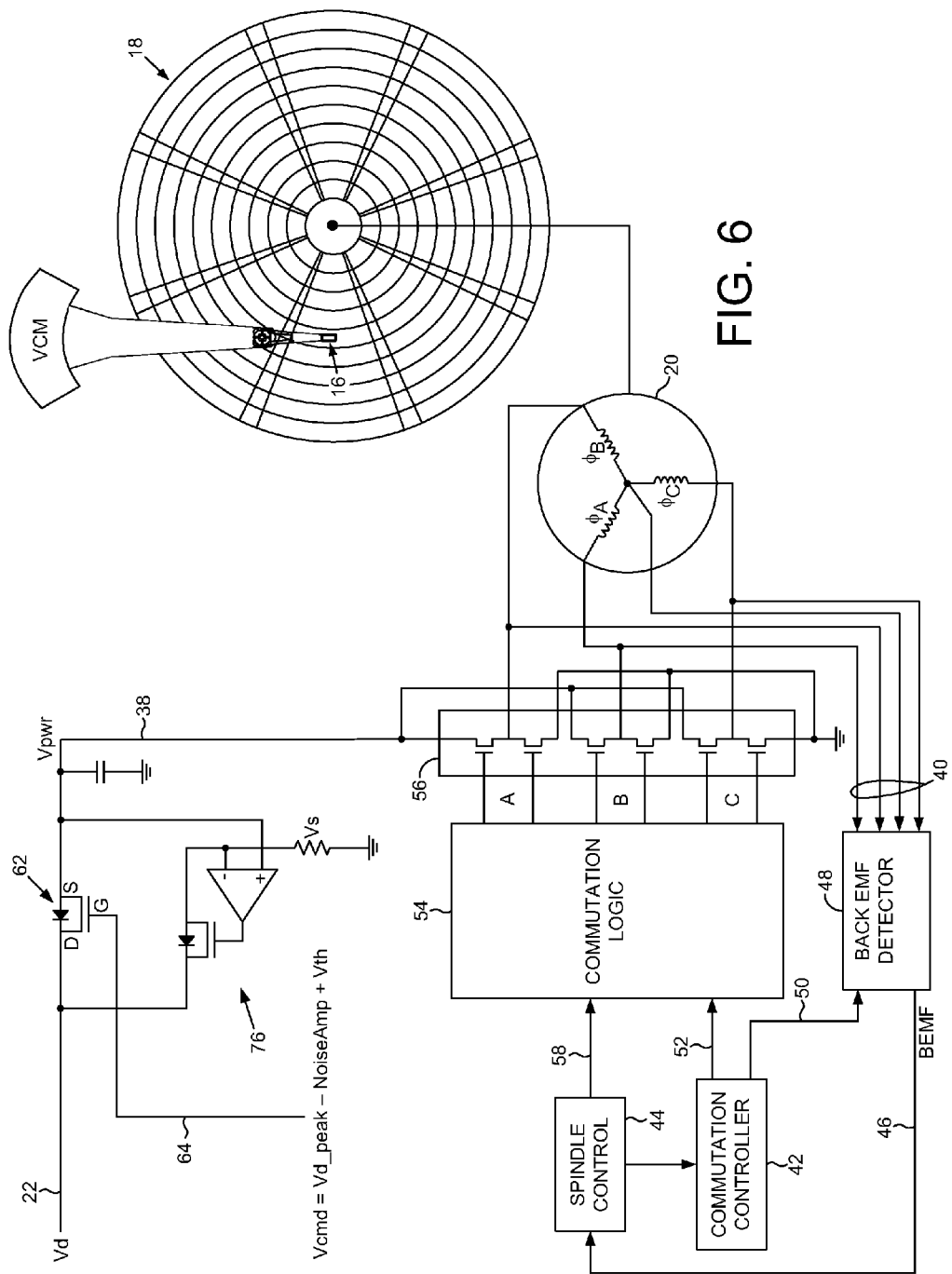
FIG. 6 shows an embodiment wherein a current sensor senses the current flowing through the clamping FET when sensing the current flowing through at least one of the windings.

FIG. 6 shows an embodiment wherein the ISOFET 66 in FIG. 4 is removed and the clamping FET 62 is configured into an isolation mode when the supply voltage 22 falls below a threshold (e.g., during a power failure). In one embodiment illustrated in FIG. 6, suitable current sensing circuitry 76 is coupled to the clamping FET 62 in order to sense the current flowing through the clamping FET 62 and therefore sense the current flowing through at least one of the windings of the spindle motor 20 during the current sense mode.

Figure 7A:
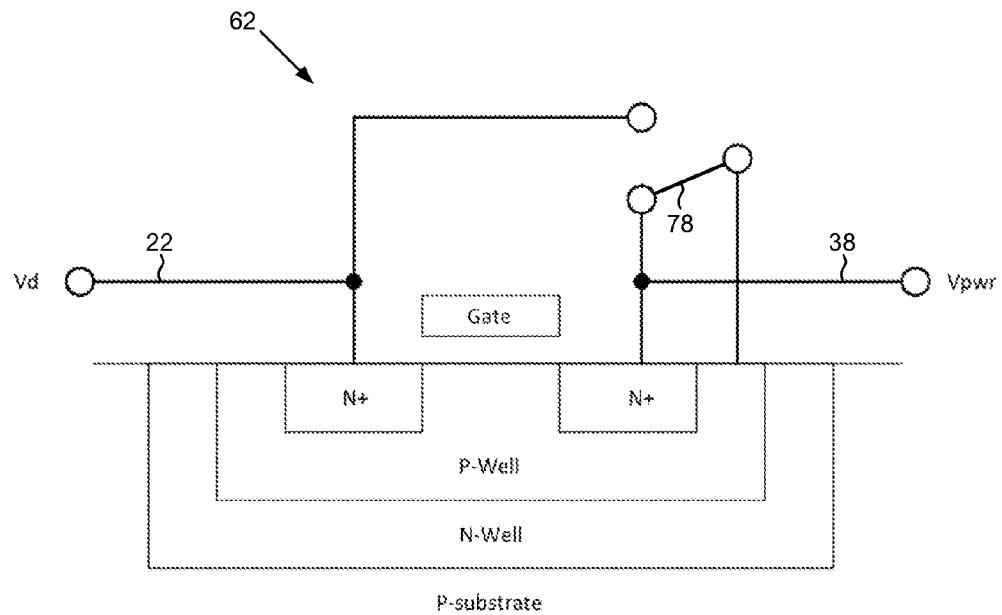
FIGS. 7A and 7B illustrate an embodiment wherein when the supply voltage falls below a threshold the clamping FET is configured into an isolation mode by disconnecting the P-well body from the source and connecting the P-well body to the drain.
Figure 7B:
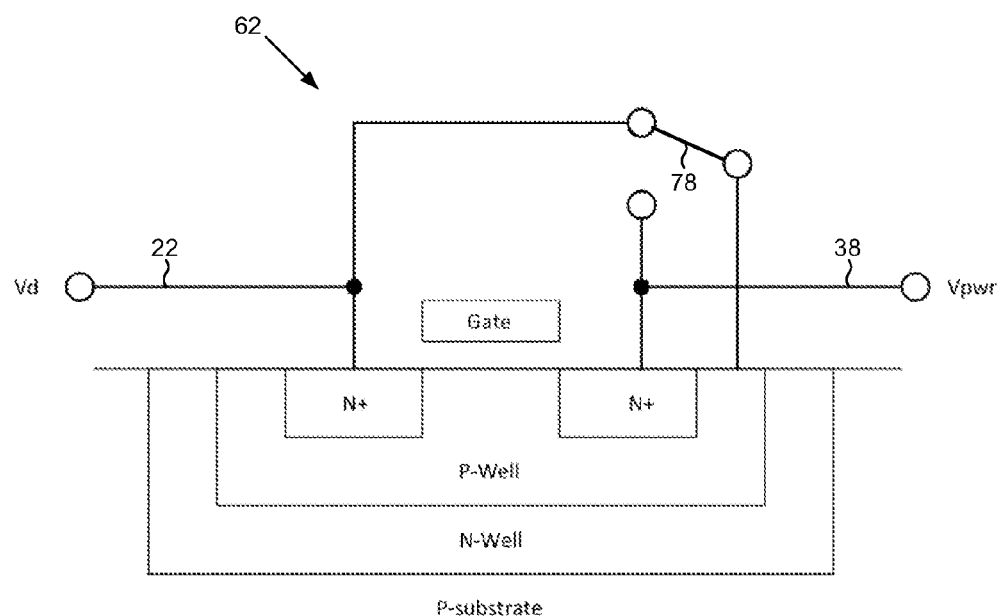

FIGS. 7A and 7B illustrate an embodiment wherein the clamping FET 62 is configured by switch 78 to clamp the power voltage 38 when in the current sense mode. When the supply voltage 22 falls below a threshold (e.g., during a power failure), the clamping FET 62 is configured into an isolation mode by configuring switch 78 to disconnect a P-well body of the clamping FET 62 from a source of the clamping FET 62 and connecting the P-well body of the clamping FET 62 to a drain of the clamping FET 62. This effectively configures the clamping FET 62 into a diode that prevents current from flowing from the power voltage 38 to the supply voltage 22 similar to the body diode in the ISOFET 66 of FIG. 4. In another embodiment (not shown), the clamping FET 62 may be configured into an isolation mode by connecting the gate terminal and the P-well body to ground. This latter embodiment assumes the supply voltage 22 remains below a threshold level that would otherwise damage the clamping FET 62 when in the isolation mode.

The clamping circuit 36 of FIG. 3 may be configured to clamp the power voltage 38 to any suitable level relative to the supply voltage 22. In one embodiment, the clamping level may be selected to be lower than the amplitude of the noise as shown in the example of FIG. 2C, but in other embodiments the clamping level may be set somewhat higher so as to attenuate some but not all of the noise in the supply voltage 22. In one embodiment, the noise amplitude of the supply voltage 22 may be predetermined by evaluating a number of disk drives in different operating environments and evaluating the maximum noise amplitude affecting the supply voltage 22. In another embodiment, the control circuitry 24 may measure the noise amplitude in the supply voltage 22 prior to entering the current sense mode, and then configure the clamping circuit 36 in order to attenuate the noise level in the power voltage 38 relative to the measured noise amplitude in the supply voltage 22.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a spindle motor configured to rotate the disk, wherein the spindle motor comprises a plurality of windings;
a head actuated over the disk; and
control circuitry configured to:
power the spindle motor with a power voltage generated in response to a supply voltage;
enable a clamping circuit when sensing a current flowing from the power voltage through at least one of the windings, wherein the clamping circuit is configured to clamp the power voltage to less than a peak voltage of the supply voltage in order to attenuate noise in the power voltage; and
disable the clamping circuit when not sensing the current.

2. The data storage device as recited in claim 1, wherein the clamping circuit is further configured to clamp the power voltage to approximately:

$$Vd\_peak - NoiseAmp$$

where:
Vd_peak represents the peak voltage of the supply voltage; and
NoiseAmp represents a noise amplitude in the supply voltage.

3. The data storage device as recited in claim 1, wherein:
the clamping circuit comprises a field effect transistor (FET) configured as a source follower; and
the control circuitry is further configured to enable the clamping circuit by adjusting a command voltage configured to control a gate of the FET.

4. The data storage device as recited in claim 3, wherein the control circuitry is further configured to enable the clamping circuit by setting the command voltage to approximately:

$$Vd\_peak - NoiseAmp + Vth$$

where:
Vd_peak represents the peak voltage of the supply voltage;
NoiseAmp represents a noise amplitude in the supply voltage; and
Vth represents a threshold voltage of the FET.

5. The data storage device as recited in claim 3, wherein the control circuitry is further configured to enable the clamping circuit by setting the command voltage to approximately:

$$Vd\_peak - NoiseAmp$$

and using a feedback loop to generate a gate voltage based on a difference between a source voltage of the FET and the command voltage, where:
the gate voltage is applied to the gate of the FET;
Vd_peak represents the peak voltage of the supply voltage;
NoiseAmp represents a noise amplitude in the supply voltage; and
Vth represents a threshold voltage of the FET.

6. The data storage device as recited in claim 3, wherein when the supply voltage falls below a threshold, the control circuitry is further configured to configure the FET into an isolation mode to substantially prevent current flowing from the power voltage to the supply voltage.

7. The data storage device as recited in claim 6, wherein the control circuitry is further configured to configure the FET into the isolation mode by disconnecting a P-well body of the FET from a source of the FET and connecting the P-well body of the FET to a drain of the FET.

8. A method of operating a data storage device, the method comprising:
powering a spindle motor with a power voltage generated in response to a supply voltage, wherein the spindle motor comprises a plurality of windings and the spindle motor is configured to rotate a disk while actuating a head over the disk;
clamping the power voltage to less than a peak voltage of the supply voltage in order to attenuate noise in the power voltage when sensing a current flowing from the power voltage through at least one of the windings; and
disabling the clamping when not sensing the current.

9. The method as recited in claim 8, further comprising clamping the power voltage to approximately:

$$Vd\_peak - NoiseAmp$$

where:
Vd_peak represents the peak voltage of the supply voltage; and
NoiseAmp represents a noise amplitude in the supply voltage.

10. The method as recited in claim 8, further comprising clamping the power voltage by adjusting a command voltage configured to control a gate of a field effect transistor (FET), wherein the FET is configured as a source follower.

11. The method as recited in claim 10, further comprising clamping the power voltage by setting the command voltage to approximately:

$$Vd\_peak - NoiseAmp + Vth$$

where:
Vd_peak represents the peak voltage of the supply voltage;
NoiseAmp represents a noise amplitude in the supply voltage; and
Vth represents a threshold voltage of the FET.

12. The method as recited in claim 10, further comprising clamping the power voltage by setting the command voltage to approximately:

$$Vd\_peak - NoiseAmp$$

and using a feedback loop to generate a gate voltage based on a difference between a source voltage of the FET and the command voltage, where:
the gate voltage is applied to the gate of the FET;
Vd_peak represents the peak voltage of the supply voltage;
NoiseAmp represents a noise amplitude in the supply voltage; and
Vth represents a threshold voltage of the FET.

13. The method as recited in claim 10, wherein when the supply voltage falls below a threshold, further comprising configuring the FET into an isolation mode to substantially prevent current flowing from the power voltage to the supply voltage.

14. The method as recited in claim 13, further comprising configuring the FET into the isolation mode by disconnecting a P-well body of the FET from a source of the FET and connecting the P-well body of the FET to a drain of the FET.

15. Control circuitry configured to:
power a spindle motor with a power voltage generated in response to a supply voltage, wherein the spindle motor comprises a plurality of windings and the spindle motor is configured to rotate a disk while actuating a head over the disk;
enable a clamping circuit when sensing a current flowing from the power voltage through at least one of the windings, wherein the clamping circuit is configured to clamp the power voltage to less than a peak voltage of the supply voltage in order to attenuate noise in the power voltage; and
disable the clamping circuit when not sensing the current.

16. The control circuitry as recited in claim 15, wherein the clamping circuit is further configured to clamp the power voltage to approximately:

$$Vd\_peak - NoiseAmp$$

where:
Vd_peak represents the peak voltage of the supply voltage; and
NoiseAmp represents a noise amplitude in the supply voltage.

17. The control circuitry as recited in claim 15, wherein:
the clamping circuit comprises a field effect transistor (FET) configured as a source follower; and
the control circuitry is further configured to enable the clamping circuit by adjusting a command voltage configured to control a gate of the FET.

18. The control circuitry as recited in claim 17, wherein when the supply voltage falls below a threshold, the control circuitry is further configured to configure the FET into an isolation mode to substantially prevent current flowing from the power voltage to the supply voltage.

19. The control circuitry as recited in claim 18, further configured to configure the FET into the isolation mode by disconnecting a P-well body of the FET from a source of the FET and connecting the P-well body of the FET to a drain of the FET.

* * * * *